(No Model.)
J. GAWRON.
CLUTCH.
No. 503,659. Patented Aug. 22, 1893.
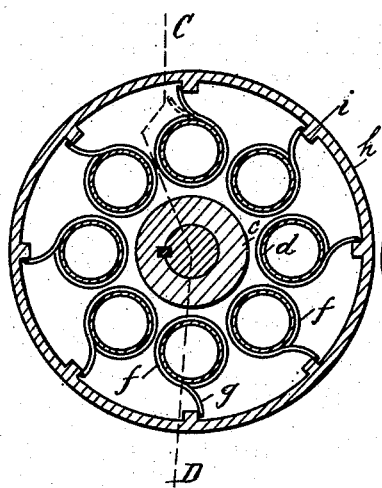
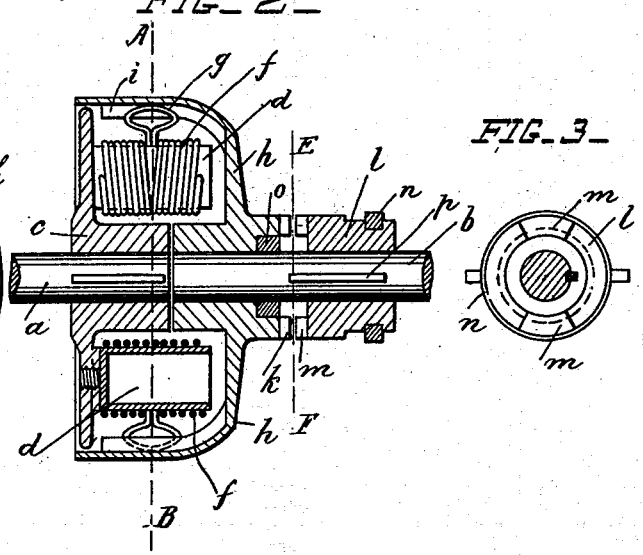
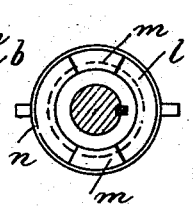
WITNESSES:
Walter Allen
INVENTOR
Josef Gawron.
BY
Herbert W. T. Jenner.
ATTORNEY.

UNITED STATES PATENT OFFICE.

JOSEF GAWRON, OF STETTIN, GERMANY, ASSIGNOR TO MARIE GAWRON, OF SAME PLACE.

CLUTCH.

SPECIFICATION forming part of Letters Patent No. 503,659, dated August 22, 1893.

Application filed May 8, 1891. Serial No. 392,133. (No model.)

*To all whom it may concern:*

Be it known that I, JOSEF GAWRON, engineer, a subject of the King of Prussia and German Emperor, residing at Stettin, in the Kingdom of Prussia and German Empire, have invented certain new and useful Improvements in Friction-Clutches; and I do hereby declare the following to be a full, clear, and exact description of the invention, such as will enable others skilled in the art to which it appertains to make and use the same.

This invention relates to friction clutches; and it consists in the novel construction and combination of the parts hereinafter fully described and claimed.

In the drawings: Figure 1 is a cross section through the clutch, taken on the line A B in Fig. 2. Fig. 2 is a longitudinal section, taken on the line C D in Fig. 1. Fig. 3 is a cross section, taken on the line E F in Fig. 2.

$a$ is the driving and $b$ the driven shaft. The part $c$ of the clutch or coupling is firmly connected with the axle $a$. Around the nave of part $c$, tubes $d$ are placed concentric with the axis. These tubes carry each a spring $f$ provided with a free engaging arm $g$ while both ends of the springs are firmly attached to the tubes $d$. In the driven axle $b$, between the guide ring $o$ and the coupling part $c$, a coupling part $h$ is situated, which is loosely journaled on the said shaft $b$ and is provided at one end with claws or teeth $k$ and on the other with projections $i$ which engage the arms $g$ of the springs $f$.

The coupling part $l$ is adjustable longitudinally on the spline $p$ by means of a lever engaging with the slip ring $n$, and the said coupling part has claws or teeth $m$ corresponding to the claws or teeth $k$. The coupling works in the following manner. If it is to be connected, the coupling part $l$ is pushed up against the coupling till the claws $m$ and $k$ engage. The axle $b$ will gradually attain the same velocity as the driving axle through the resistance of the springs coming into play and during this time the resistance of the springs is so far overcome that they assume the position shown in dotted lines in the upper part of Fig. 1, so that the projections $i$ slide over them, and the succeeding ones come into play. If it is to be disengaged, the part $l$ is moved in the opposite direction, so that the claws disengage. If, during the running, the resistance becomes too great, the same effect is produced as in the case of connecting, until the normal rotary speed is attained, namely, the projections $i$ slip over the arms $g$ of the springs and an automatic uncoupling results until the resistance has again fallen to its normal amount. In the spring coupling described above, it is immaterial whether the axle $a$ or the axle $b$ be the driving one.

What I claim is—

1. The combination, with two shafts arranged in line with each other, each shaft having one half of the clutch operatively connected to it, of a series of springs carried by one half of the clutch and provided with radially projecting ends adapted to engage with projections on the inner wall of the other half of the clutch, substantially as and for the purpose set forth.

2. The combination, with two shafts arranged in line with each other, of the two halves of the clutch operatively connected to the said shafts, and a series of springs carried by the inner half of the clutch and adapted to engage with a series of projections on the inner wall of the outer half of the clutch, substantially as and for the purpose set forth.

3. The combination, with the shaft $a$, and the half $c$ of the clutch provided with the spring supports $d$ arranged concentric with the said shaft; of the shaft $b$, the half $h$ of the clutch operatively connected to the shaft $b$ and provided with the projections $i$, and the springs $f$ secured to the said spring supports and provided with arms $g$ adapted to engage with the said projections, substantially as and for the purpose set forth.

In testimony whereof I affix my signature in presence of two witnesses.

JOSEF GAWRON.

Witnesses:
CARL SEHLMACHER,
RICHD. KOPPEN.